Dec. 25, 1962 W. J. D. ESCHER 3,070,330
ATTITUDE AND PROPELLANT FLOW CONTROL SYSTEM AND METHOD
Filed March 20, 1961 2 Sheets-Sheet 2

INVENTOR
W. J. D. ESCHER

BY  J. O'Tresansky
ATTORNEYS

United States Patent Office 3,070,330
Patented Dec. 25, 1962

3,070,330
ATTITUDE AND PROPELLANT FLOW CONTROL
SYSTEM AND METHOD
William J. D. Escher, Washington, D.C., assignor to the
United States of America as represented by the Administrator of the National Aeronautics and Space
Administration
Filed Mar. 20, 1961, Ser. No. 97,112
14 Claims. (Cl. 244—76)
(Granted under Title 35, U.S. Code (1952), sec. 266)

The invention described herein may be manufactured and used by or for the Government of the United States of America for governmental purposes without the payment of any royalties thereon or therefor.

This invention relates generally to a reaction thrust propelled vehicle attitude control system, and more particularly to an integrated differential thrust variation method and system for three axis attitude control and propellant flow control of a liquid propellant, rocket-powered vehicle.

Disturbances encountered by a rocket-powered vehicle in flight can cause rotating motions about the three orthogonal axes of the vehicle which, unless counteracted, can prevent fulfillment of the overall guidance program of the rocket vehicle. The disturbances may be externally caused, such as by gusts and the like, or internally produced by such factors as thrust-chamber misalignment, propellant sloshing or structural deformation. To counteract the effects of these disturbances rocket-propelled vehicles are generally provided with active attitude control systems which control the orientation of the vehicle about its three orthogonal axes. These motions are generally referred to as roll, pitch and yaw.

Several diverse arrangements have been heretofore proposed to provide three axis attitude control of rocket propelled vehicles. Many of these arrangements rely upon the generation of compensating aerodynamic forces and are limited to use within the atmosphere. Other arrangements utilizing exhaust immersed jet vanes or gimbaled thrust chambers provide for the selective deflection of the thrust of the main power plant and are utilizable both within and without the atmosphere. In practice, however, the action of the fast flowing high temperature gases have been found to cause rapid erosion of the jet vanes. In addition, the jet vanes themselves have been found to produce drag and undesirable disturbances in the power plant exhaust. Although the gimbaled, or pivotally mounted, main thrust chamber overcomes many of the aforedescribed difficulties by selectively varying the direction of the thrust relative to the longitudinal axis of the vehicle as it swings about its pivot point, structural and weight considerations of high thrust rocket engine designs, such, for example, as those exceeding one million pounds, for vacuum operations make gimbal mounting somewhat undesirable. More particularly, the overall needs for space vehicle attitude control require significantly larger angular accelerations to be imposed upon the thrust chamber, thereby requiring design of more sturdy vehicle and thrust chamber structures to withstand the increased propulsive thrust concentrated at the pivot point. Heavier actuators and associated equipment are required to move the thrust chamber with required response. The transmission of large reaction forces from the gimbaling action into a light-weight vehicle can cause sustained oscillations, thereby introducing a structural feedback problem. A major difficulty with the gimbaled engine in high thrust rocket engines is that of supplying high pressure propellants by means of flexible feed lines, which are heavier and more cumbersome than fixed feed lines, thereby further increasing the gimbaling loads. One significant shortcoming of all present day rocket powered vehicle control systems is an absence of a suitable integrated thrust vector and propellant flow programming control system.

Accordingly, one object of this invention is to provide a new and improved orientation control system for aerial and space vehicles.

Another object of the invention is the provision of a new and improved thrust vector positioning control system for liquid propellant-powered vehicles.

Still another object of the present invention is to provide a new and improved fixed three axis attitude control arrangement for liquid propellant rocket-powered vehicles.

A further object of the instant invention is to provide a new and improved two or three axis attitude control apparatus for a liquid propellant rocket-powered vehicle capable of maintaining a constant propulsive thrust.

A still further object of this invention is the provision of a new and improved system for effecting integrated vehicle orientation and propellant flow control of an aerial or space vehicle.

Another still further object of the instant invention is the provision of new and improved propellant flow control to provide superior thrust level programming and propellant mixture ratio control.

Still another further object of the instant invention is to provide a new and improved rocket engine assembly of fixed symmetrically-arranged thrust chambers for an aerial or space vehicle.

One other object of this invention is the provision of a novel method for effecting thrust vector control of a reaction type engine.

Briefly, in accordance with one embodiment of this invention, these and other objects are attained by providing in a rocket-powered vehicle the combination of a rearward symmetric assembly of two pairs of thrust chambers fixedly arranged in diametrically opposed relationship about the longitudinal axis of the rocket vehicle, the thrust chambers of each pair being slightly canted in two directions to produce oppositely directed equal moments about the center of gravity of the rocket vehicle in either the yaw or pitch roll planes, liquid fuel and oxidant supplies coupled to each thrust chamber to provide for the generation of thrust by each chamber, sensing apparatus for developing individual error signals correlative to the magnitude of vehicular orientation disturbances in each of the three orthogonal axes about the center of gravity of the rocket vehicle, and flow control valves individual to each of the fuel and oxidant supplies and being responsive to the summation of the developed error signals to effect generation of a differential thrust variation by the thrust chamber assembly so as to develop moments about any of the three orthogonal axes necessary to correct for the orientation disturbances of the rocket vehicle. Programming and sensing devices may also be coupled to the flow control valves to provide for propellant flow to the thrust chamber assembly correlative to a desired magnitude of thrust level, instantaneous mixture ratio, and the needs of start and shut-down transient periods.

A more complete appreciation of the invention and many of the attendant advantages thereof will be readily appreciated as the same becomes better understood by reference to the following detailed description when considered in connection with the accompanying drawings wherein.

Figure 1:
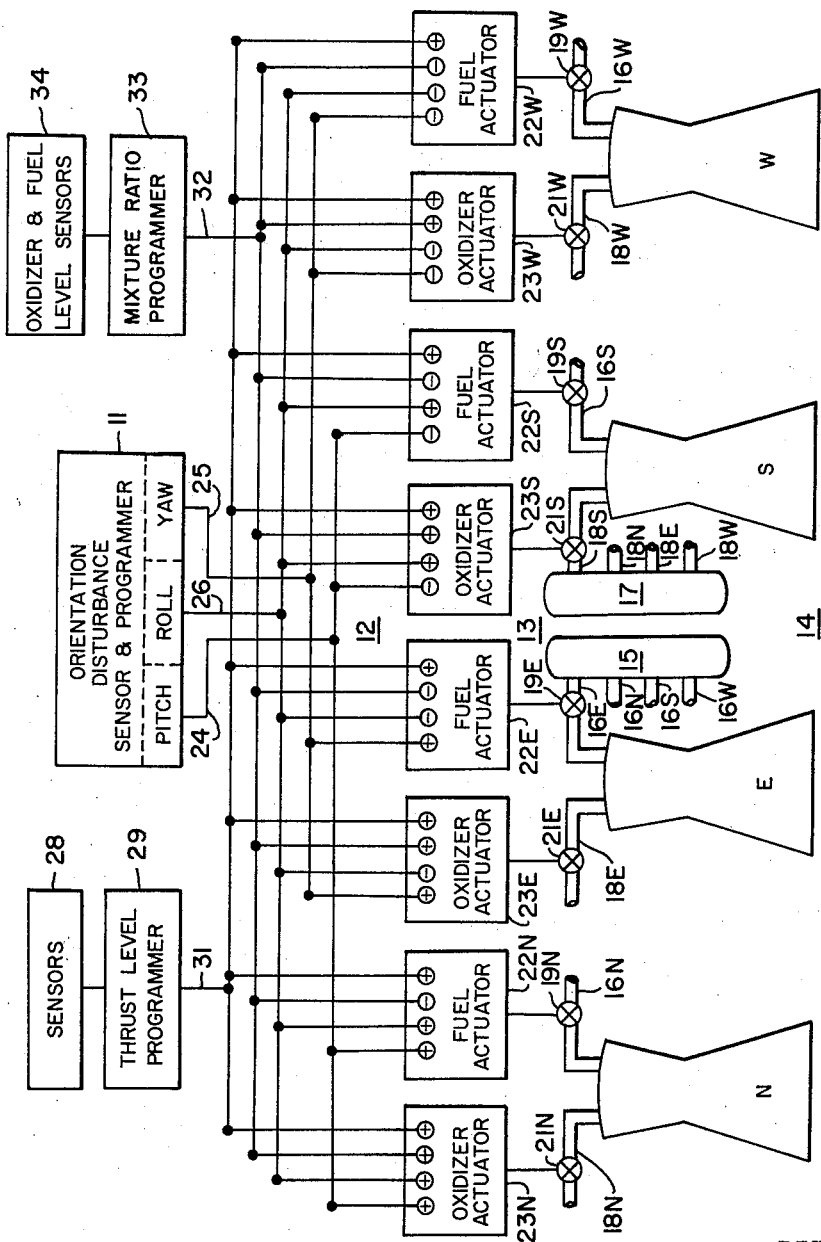
FIG. 1 is a block diagrammatic view of the overall vehicle attitude control system according to the present invention.

Referring now to the drawings wherein like reference characters designate identical or corresponding parts throughout the several views, and more particularly to FIG. 1 thereof wherein the vehicle borne attitude control system of the present invention is shown as consisting essentially of a vehicle orientation disturbance sensor 11 capable of developing individual electrical signals corresponding to vehicular orientation disturbances in the yaw, pitch and roll planes which are selectively applied through a signal translating network 12 to a propellant flow control apparatus 13 capable of apportioning the propulsive thrust among the fixed thrust chambers of a multiple chamber liquid propellant rocket engine 14. By way of example, the vehicle orientation disturbance sensor 11 may be a vehicle borne autopilot or an inertial guidance platform.

In the illustrated embodiment of the invention, four thrust, or reaction, chambers, which may be of identical size, designated by reference characters N, E, S and W are shown. The thrust chambers are arranged in two mutually perpendicular pairs of N, S and E, W, respectively. This configuration is considered to be particularly suitable for providing three axis attitude control of a rocket-propelled vehicle. Each of the thrust chambers N, E, S and W is connected to a fuel supply 15, such as kerosene, through individual feed lines 16N, 16E, 16S and 16W, respectively, and to an oxidizer supply 17, such as liquid oxygen, through individual fixed feed lines 18N, 18E, 18S and 18W, respectively. It is to be understood that the fuel and oxidizer supplies may either be common to all of the thrust chambers, or, alternatively, individual to each one thereof. It is to be further understood that the propellant supply for the rocket engine 14 may be pressurized, acceleration head, or pump fed. Each of the fuel feed lines of the illustrated embodiment is provided with individual flow control valves 19N, 19E, 19S and 19W. Similarly, each of the oxidizer feed lines is provided with individual flow control valves 21N, 21E, 21S and 21W.

The operation of the propellant control valves is regulated by actuators, such for example as electrohydraulic type actuators 22 and 23, which develop a controlling effect in response to the algebraic summation of the error signals applied by the signal translating network 12. Actuators 22N, 22E, 22S and 22W are connected to individual ones of the fuel control valves and actuators 23N, 23E, 23S and 23W are connected to individual ones of the oxidizer control valves.

Figure 2:
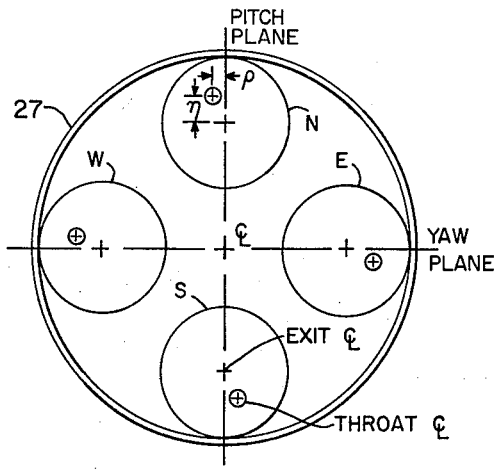
FIG. 2 is a diagrammatic end view of one embodiment of a multiple thrust chamber assembly of the system of FIG. 1.

As more clearly shown in FIG. 2, the thrust chambers of the rocket engine 14 are positioned at the rear of the vehicle in mutually perpendicular planes about the longitudinal axis, or centerline, of the vehicle 27; thrust chamber pair N and S lying in the yaw plane and thrust chamber pair E and W lying in the pitch plane of the rocket-propelled vehicle. Where the thrust chambers utilized generate substantially identical magnitude thrusts, they are located substantially equidistantly from the vehicle centerline. The longitudinal axis of each thrust chamber is slightly displaced in two directions, as represented by the angle $\eta$ in a plane perpendicular to a plane of the vehicle centerline and the angle $\rho$ in a plane of the vehicle centerline, to effect production of oppositely directed moments about the vehicle center of gravity by each of the pairs of thrust chambers, as will be more fully explained hereinafter. The angles are illustrated in FIG. 2 by the relative displacement of centerlines through the throat and exit centers of each thrust chamber parallel to the vehicle centerline. In certain situations the angle $\eta$ may approach zero.

Figure 3:
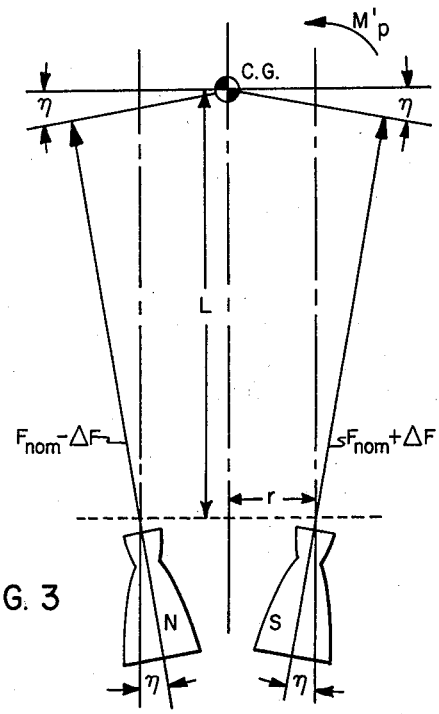

It will be noted from FIG. 1 that the individual pitch, yaw and roll error signals developed by orientation disturbance sensor 11 are applied to diverse ones of the propellant actuators 22 and 23 by conductors 24, 25 and 26 of signal network 12; conductor 24 transmitting the pitch signal to the actuators of thrust chambers N and S; conductor 25 transmitting the yaw signal to the actuators of thrust chambers E and W; conductor 26 transmitting the yaw signal to the actuators of thrust chambers E and W; conductor 26 transmitting the roll signal to each of the actuators. The polarity markings (+ and −) on the propellant actuators indicate the responsiveness of the individual actuator to a particular signal. For example, in response to a pitch error signal, actuators 22N and 23N will actuate fuel and oxidizer control valves 19N and 21N to increase the propellant flow to thrust chamber N, while, simultaneously, actuators 22S and 23S will actuate fuel and oxidizer control valves 19S and 21S to decrease, by a corresponding amount, the propellant flow to thrust chamber S. This action establishes a corrective pitch control moment through the resultant differential thrust variation developed by the two pitch plane thrust chambers N and S. As shown in FIG. 3, wherein $\eta$ represents the small cant angle ($\eta < 10°$) of the two pitch plane fixed thrust chambers N and S in the plane of the vehicle centerline, $r$ the distance from the vehicle centerline ℄ to the individual thrust chamber lines of thrust, $L$ the perpendicular distance from the vehicle center of gravity to an arbitrarily located plane of thrust introduction normal to the vehicle centerline, and $F_{nom} - \Delta F$ and $F_{nom} + \Delta F$ the differential thrusts developed by thrust chambers N and S, respectively, the magnitude of the established pitch moment $M'_p$ about the vehicle center of gravity is represented by the equation $$M'_p = 2\Delta F \left[ \frac{r}{\cos \eta} + \sin \eta (L - r \tan \eta) \right]$$

when $-\Delta F$ and $+\Delta F$ are equal. It will be obvious from FIG. 3 that this action will be observed for any coplanar symmetrical arrangement of the thrust chambers other than with thrust lines passing through the vehicle center of gravity. A corrective yaw control moment can be similarly established by the differential throttling of the yaw plane fixed thrust chambers E and W. It is to be noted, therefore, that the invention primarily provides a proportional, rather than an on-off control mode.

Figure 4A:
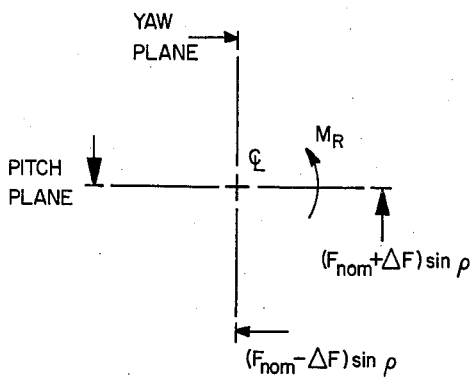
FIGS. 3 and 4 are vectorial representations of the thrust forces developed by the assembly of FIG. 2; and, FIG. 5 is a diagrammatic end view of an alternative embodiment of a multiple thrust chamber assembly of the present invention.

A roll control moment about the vehicle longitudinal axis is generated by the differential variation of thrust in all of the thrust chambers of the multiple chamber engine 14. As shown in FIG. 1, a roll error signal is applied by conductor 26 to the propellant actuators of each of the thrust chambers. As indicated by the polarity markings, propellant actuators 22N, 22S, 23N and 23S are set to respond to a particular roll signal in a manner whereby the thrusts developed by each of the pitch plane pair of thrust chambers N and S increase while propellant actuators 22E, 22W, 23E and 23W are set to respond to the particular roll signal in a manner whereby the thrusts developed by each of the yaw plane pair of thrust chambers E and W decrease by a corresponding amount. Thus by oppositely canting each thrust chamber within a pair by a small angle $\rho$ in the plane normal to the radius $r$, as more clearly shown in FIG. 2, equal magnitude and oppositely directed couples about the roll axis of the vehicle can be generated by the two pairs of thrust chambers in response to a roll error signal. It will be apparent, therefore, that a substantial net roll moment is developed when the thrust generated by the two thrust chambers of one pair of chambers is increased and the thrust generated by the two thrust chambers of the other pair of chambers is correspondingly decreased. It may be seen from FIG. 4a, which represents a situation wherein the thrust developed by both of the pitch plane chambers is increased and that of the yaw plane chambers is correspondingly decreased, that a net roll moment $M_R$ is developed in favor of the pitch plane couple. Thus a control moment of the desired sense and magnitude is effected while, again, the total propellant flow rate to the engine is maintained constant. The magnitude of the roll control moment developed is $$M_r = \pm 4 \Delta F \sin \rho \cdot r$$

Figure 4B:
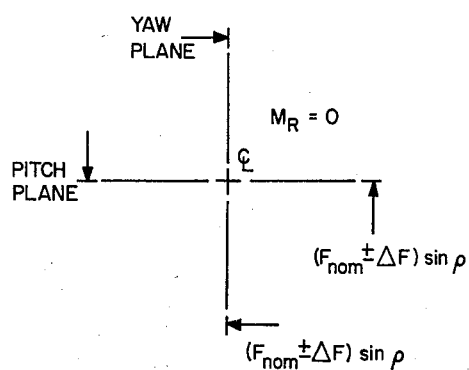

It will be apparent from FIG. 4b, which represents the neutral roll condition of the system, that when all thrust chambers provide an equal thrust no net roll moment is developed.

It is to be noted that, in general, the roll moments required for attitude control are significantly smaller than the pitch and yaw control moments. Also, the loss in thrust available for propelling the vehicle by reason of the thrust chamber cant angles $\eta$ associated with pitch/yaw and roll $\rho$ control are near negligible for small angles. It will be understood, therefore, that the overall performance of the attitude control system of the present invention is dependent on two parameters; the maximum relative throttling range and the total thrust chamber cant angle. Any interaction or cross-coupling between individual error signals is of a second or third order and, hence, the effects thereof on the operation of the system are negligible.

Figure 5:
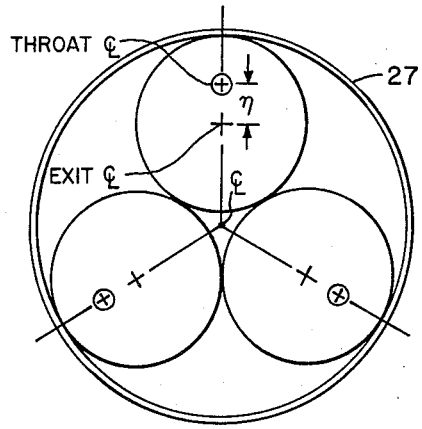

It will be apparent that although the method and apparatus of the invention have been specifically described in terms of four fixed tail positioned thrust chambers providing for three axis attitude control, that the invention is not so limited, and that two axis attitude control, i.e., pitch and yaw, can be provided for by utilization of three rearward thrust chambers in a symmetrical triangular configuration, as shown in FIG. 5. In this arrangement the thrust chambers are only canted by the angle $\eta$ in the planes of the vehicle centerline.

In addition to providing vehicle attitude control, the instant invention is also capable of providing control over other significant variables affecting the maximum performance of a rocket-propelled vehicle. The ability of a vehicle to perform precision trajectory programs and orbit adaptation maneuvers in a reproducible manner depends fundamentally on both thrust vector orientation and thrust magnitude control. Such factors as the transient operational requirements of start, or restart, and shutdown, thrust termination upon attainment of a desired vehicle velocity, or optimum utilization of propulsive energy within limits dictated by external factors as aerodynamic drag, heating, structure and crew imposed acceleration, necessitate the regulation of propellant flow control. Continuous, in flight, thrust level control is readily provided by the system of the instant invention by the inclusion of sensing transducers 28 responsive to the aforedescribed external factors and a thrust level programming device 29 for developing a resultant control signal which is applied over a conductor 31 of the signal network 12 to the propellant flow actuators 22 and 23. The actuators are set up to respond to the control signal in a manner whereby the propulsion thrust developed by the multiple chamber rocket engine 14 is at the level dictated by the external factors.

Similarly, to reduce the possibility of unscheduled vehicle power cut-off due to premature exhaustion of one or the other propellant by such uncertain factors as boil-off losses, acceleration effects, propellant density changes, and tank pressure variations, which cannot be accounted for by a pre-set operating mixture ratio, an active mixture ratio control system is required. Continuous propellant mixture ratio control is readily provided by the system of the present invention by setting the fuel control actuators 22 and the oxidizer control actuators 23 to be differentially responsive to a control signal applied over a conductor 32 from a mixture ratio programmer 33 in response to signals from sensors 34 which establish the amount of each propellant remaining in the supply tanks 15 and 17.

It will be apparent that the method and apparatus of the herein described invention achieve vehicle attitude control and propellant flow programming upon the principle of propellant flow control. It will also be apparent that although the invention has been described in connection with the operation of a liquid propellant rocket vehicle, that it is not so limited, and is equally applicable to other reaction propulsion systems such as nuclear or ion plasma propelled vehicles.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. In a vehicle, a propulsion and attitude control system comprising a plurality of canted thrust chambers rigidly secured to the vehicle in a symmetrical configuration for providing a propulsive thrust, means disposed in the vehicle for developing individual signals indicative of the magnitude and direction of attitude disturbances of the vehicle about diverse ones of its orthogonal axes; and means disposed in the vehicle individual to each of said thrust chambers being selectively responsive to said signals for effecting a differential variation of the thrust developed by said chambers thereby to provide said propulsive thrust, and to generate moments in the planes of the vehicle orthogonal axes corrective of said attitude disturbances.

2. In a vehicle, a propulsion control system comprising a plurality of thrust chambers fixedly mounted on the vehicle for providing a propulsive thrust, means for developing individual signals representative of the attitude disturbances of the vehicle, fuel supply means for said thrust chambers, oxidizer supply means for said thrust chambers, means responsive to the relative amounts of the fuel and the oxidizer contained in said supply means for developing signals representative of a desired propellant mixture ratio for said thrust chambers, and means individual to each of said thrust chambers selectively responsive to the summation of said attitude disturbance developed signals to differentially throttle said thrust chambers to develop moments about the vehicle corrective of said attitude disturbances with said desired propellant mixture ratio.

3. In a vehicle, a propulsion controller comprising a plurality of thrust chambers fixedly mounted on the vehicle for providing a propulsive thrust, means for developing individual error signals representative of the orientation disturbances of the vehicle, fuel supply means for said thrust chambers, oxidizer supply means for said thrust chambers, means responsive to the relative amounts of the fuel and the oxidizer in said supply means for developing control signals representative of a desired propellant mixture ratio for said thrust chambers, means for developing control signals representative of the desired level of propulsive thrust to be provided by said thrust chambers, and means individual to each of said thrust chambers selectively responsive to said developed error signals to differentially throttle said thrust chambers to develop moments about the vehicle corrective of said orientation disturbances at said desired level of propulsive thrust with said desired propellant mixture ratio.

4. In a vehicle, an attitude control system comprising a plurality of symmetrically arranged thrust chambers mounted rearwardly on the vehicle at a fixed small cant angle for providing a propulsive thrust at a desired level, means for sensing the attitude disturbances of the vehicle about its orthogonal axes, means for developing individual signals indicative of each of said attitude disturbances, fuel supply means connected to each of said thrust chambers, oxidizer supply means connected to each of said thrust chambers, flow control means individual to each fuel supply connection and each oxidizer supply connection selectively responsive to said attitude disturbance signals to differentially throttle said thrust chambers to generate moments about diverse ones of said orthogonal axes corrective of said attitude disturbances at said desired level of propulsive thrust.

5. In a vehicle, a three axes attitude controller comprising two thrust chamber pairs fixedly secured to the tail portion of the vehicle for providing propulsive thrust for the vehicle, the individual thrust chambers of one of said pairs being oriented to produce oppositely directed moments about the vehicle center of gravity in the pitch plane and the individual thrust chambers of the other of said pairs being oriented to produce oppositely directed moments about the vehicle center of gravity in the yaw plane, propellant supply means for each of said thrust chambers, means for developing individual signals representative of the attitude disturbances of the vehicle in each of the yaw, pitch and roll planes, and means individual to each of said supply means selectively responsive to said developed signals for differentially varying the propellant flow to the individual thrust chambers in one or both of said two thrust chamber pairs to thereby produce a net moment about said center of gravity corrective of the vehicle disturbance in the yaw and/or pitch planes, and to differentially vary the propellant flow to each of said thrust chamber pairs to thereby produce a net moment about said center of gravity corrective of the vehicle disturbance in the roll plane.

6. In a vehicle, a three axes attitude controller comprising two mutually perpendicular thrust chamber pairs fixedly secured to the afterbody of the vehicle for providing a propulsive thrust at a desired level for the vehicle, the individual thrust chambers of one of said thrust chamber pairs being oriented to produce oppositely directed moments about the vehicle center of gravity in the pitch plane and the individual thrust chambers of the other of said thrust chamber pairs being oriented to produce oppositely directed moments about the vehicle center of gravity in the yaw plane, propellant supply means for each of said thrust chambers, means for developing individual signals representative of the attitude disturbances of the vehicle in each of the yaw, pitch and roll planes, and control means individual to each of said supply means selectively responsive to said developed signals for controlling the propellant flow to said thrust chambers to effect the generation of moments about said center of gravity corrective of said attitude disturbances at said desired level of propulsive thrust, said control means in response to a signal representative of a pitch plane attitude disturbance providing for differential throttling of the individual thrust chambers in said one thrust chamber pair, said control means in response to a signal representative of a yaw plane attitude disturbance providing for differential throttling of the individual thrust chambers in said other thrust chamber pair, said control means in response to a signal representative of a roll plane attitude disturbance providing for differential throttling of each of said two thrust chamber pairs.

7. A three axes attitude controller for a vehicle comprising two thrust chamber pairs fixedly secured to the afterbody of the vehicle for providing a net propulsive thrust for the vehicle, the individual thrust chambers of each thrust chamber pair being oriented to produce oppositely directed moments about the vehicle center of gravity in the yaw and pitch planes, respectively, means for developing individual error signals representative of the vehicle attitude disturbances in each of the yaw, pitch and roll planes, fuel supply means for said thrust chambers, oxidizer supply means for said thrust chambers, means responsive to the relative amounts of fuel and oxidizer in said supply means for developing control signals representative of a desired propellant mixture ratio for said thrust chambers, means for developing control signals representative of the desired level of said net propulsive thrust, and control means individual to each of said supply means selectively responsive to said developed error signals for controlling the propellant flow to said thrust chambers to effect the generation of moments about said center of gravity corrective of said attitude disturbances at said desired level of net propulsive thrust with said desired propellant mixture ratio; said control means in response to an error signal representative of a pitch plane attitude disturbance selectively increasing the propellant flow to one thrust chamber of said pitch plane thrust chamber pair and simultaneously decreasing, by a corresponding amount, the propellant flow to the other thrust chamber thereof, said control means in response to an error signal representative of a yaw plane attitude disturbance selectively increasing the propellant flow to one thrust chamber of said yaw plane thrust chamber pair and simultaneously decreasing, by a corresponding amount, the propellant flow to the other thrust chamber thereof, said control means in response to an error signal representative of a roll plane attitude disturbance selectively increasing the propellant flow to one of said thrust chamber pairs and simultaneously decreasing, by a corresponding amount, the propellant flow to the other of said thrust chamber pairs.

8. A multiple chamber rocket engine assembly for a vehicle comprising a plurality of thrust chambers arranged in two pairs fixedly mounted on the vehicle afterbody in a symmetrical configuration about the vehicle longitudinal axis, the thrust chambers of one of said pairs being canted inwardly in one plane of said longitudinal axis, and the thrust chambers of the other of said pairs being canted inwardly in another plane of said longitudinal axis, said planes being mutually perpendicular.

9. A multiple chamber rocket engine for a vehicle comprising two thrust chamber pairs having individual thrust chambers rigidly mounted on the vehicle back extremity on diametrically opposed sides of the vehicle longitudinal axis in mutually perpendicular planes of said longitudinal axis, the thrust chambers of each of said pairs being oppositely canted in the plane of the respective thrust chamber pair, said thrust chambers of each of said pairs also being oppositely canted in a plane normal to the plane of the respective thrust chamber pair.

10. A method of providing roll attitude control of a vehicle propelled by the propulsive forces generated by a plurality of thrust chambers comprising the steps of fixedly positioning the thrust chambers symmetrically about the vehicle longitudinal axis in mutually perpendicular planes, orienting the thrust chambers of each pair to produce oppositely directed moments about the vehicle longitudinal axis, and differentially throttling the thrust chambers of each pair to produce a net turning moment about the vehicle longitudinal axis without changing the level of the propulsive forces propelling the vehicle.

11. In a reaction thrust propelled vehicle, an integrated differential thrust three axis attitude control system comprising: at least two pairs of fixed thrust chambers in opposed relationship about the vehicle longitudinal axis, each said chamber being canted in two directions so that the resultant of each said chamber opposes the other and thus serves to produce oppositely directed equal moments about the vehicle center of gravity in the pitch or yaw planes, while the resultant of selective differential variation of thrust in each said pair of chambers serves to produce a controlled roll moment about the vehicle longitudinal axis, propellant supply means in communication with each said thrust chamber, signal developing sensing means responsive to vehicle orientation serving to develop correction signals correlative to said vehicle orientation, flow control means in operative relationship with said propellant supply means, said flow control means responsive to said developed correction signals and serving to effect generation of differential thrust between selected thrust chambers, and programming and sensing means in operative relationship with said flow control means for effecting desired thrust levels.

12. In a reaction thrust propelled vehicle, an integrated differential thrust three axis attitude control system comprising: at least two sets of paired fixed thrust chambers in opposed relationship about the vehicle longitudinal axis, each said set being canted in two directions so that the resultant thrust of each said set opposes the other and thus serves to produce oppositely directed equal moments about the vehicle center of gravity in the pitch or yaw planes, while the resultant thrust of selective differential variation of thrust in each said paired set of chambers serves to produce a controlled roll moment about the vehicle longitudinal axis, propellant supply means in communication with each said set, signal developing sensing means responsive to vehicle orientation serving to develop correction signals correlative to said vehicle orientation, flow control means in operative relationship with said propellant supply means, said flow control means responsive to said developed correction signals and serving to effect generation of differential thrust between selected sets, and programming and sensing means in operative relationship with said flow control means for effecting desired thrust levels.

13. In combination, a vehicle and a multiple chamber rocket engine assembly fixedly mounted on the aft end thereof, said rocket engine assembly consisting of a multiplicity of fixed symmetrically mounted, paired thrust chamber sets; at least one of the thrust chambers of at least one of said paired sets being oppositely canted in a plane normal to the plane of said paired set, and at least one of the thrust chambers of at least one other of said paired sets being oppositely canted in a plane normal to the plane of said other thrust paired set.

14. A method of providing three axis attitude control of a vehicle propelled by propulsive forces generated by a plurality of thrust chambers comprising the steps of fixedly positioning the thrust chambers in paired sets symmetrically about the vehicle longitudinal axis in the yaw and pitch planes, orienting the thrust chambers of each paired set to produce oppositely directed moments about the center of gravity and the longitudinal axis of the vehicle, and differentially throttling the thrust chambers of each paired set to produce a net turning moment about the vehicle center of gravity in the respective attitude plane and about the vehicle longitudinal axis without changing the level of the propulsive forces propelling the vehicle.

References Cited in the file of this patent

UNITED STATES PATENTS

| | | |
|---|---|---|
| 2,395,435 | Thompson et al. | Feb. 26, 1946 |
| 2,943,822 | Hamilton | July 5, 1960 |
| 2,952,123 | Rich | Sept. 13, 1960 |
| 2,990,905 | Lilley | July 4, 1961 |

OTHER REFERENCES

Aero Digest, vol. 60, No. 4, April 1950, pp. 100–102.